United States Patent [19]
Himayat et al.

[11] Patent Number: 5,742,591
[45] Date of Patent: Apr. 21, 1998

[54] INTERFERENCE CANCELLATION SYSTEM FOR CATV RETURN TRANSMISSIONS

[75] Inventors: Nageen Himayat, Huntingdon Valley; Charles A. Eldering, Doylestown, both of Pa.

[73] Assignee: General Instrument Corporation, Hatboro, Pa.

[21] Appl. No.: 473,755

[22] Filed: Jun. 7, 1995

[51] Int. Cl.⁶ ............................................. H04B 3/20
[52] U.S. Cl. ........................ 370/286; 375/346; 370/201
[58] Field of Search ........................ 370/32.1, 32, 286, 370/282, 283, 284, 289, 290, 291, 292, 201; 375/349, 346, 347; 415/305, 306, 304

[56] References Cited

U.S. PATENT DOCUMENTS

| | | | |
|---|---|---|---|
| 4,408,615 | 10/1983 | Grossman | 128/696 |
| 4,412,341 | 10/1983 | Gersho et al. | 375/102 |
| 4,435,618 | 3/1984 | Fujishima | 381/7 |
| 4,435,841 | 3/1984 | Dobrovolny | 455/180 |
| 4,439,770 | 3/1984 | Lewis et al. | 343/381 |
| 4,472,814 | 9/1984 | Gutleber | 375/34 |
| 4,472,815 | 9/1984 | Gutleber | 375/34 |
| 4,475,214 | 10/1984 | Gutleber | 375/34 |
| 4,549,183 | 10/1985 | Farina | 343/7 |
| 4,608,569 | 8/1986 | Dickey, Jr. et al. | 343/384 |
| 4,612,549 | 9/1986 | Geyer, Jr. et al. | 343/379 |
| 4,633,315 | 12/1986 | Kasperkovitz | 358/188 |
| 4,660,042 | 4/1987 | Ekstrom | 342/175 |
| 4,689,628 | 8/1987 | Lewis | 342/384 |
| 4,701,935 | 10/1987 | Namiki | 375/4 |
| 4,736,455 | 4/1988 | Matsue et al. | 455/138 |
| 4,748,667 | 5/1988 | Farmer et al. | 380/7 |
| 4,812,851 | 3/1989 | Giubardo | 342/389 |
| 4,893,350 | 1/1990 | Minamisono et al. | 455/278 |
| 4,991,165 | 2/1991 | Cronyn | 370/32 |
| 4,996,488 | 2/1991 | Nave | 324/613 |

(List continued on next page.)

FOREIGN PATENT DOCUMENTS

WO8910663 11/1989 WIPO.
WO9115064 10/1991 WIPO.

OTHER PUBLICATIONS

Y. Dutertre/M. Bourgeot, Characterization and Possible Uses of the Return Channel On Sub–Split Coaxial Distribution Networks, Jun. 1989, pp. 411–414.

Steven M. Kay, Modern Spectral Estimation: Theory and Application, (Prentice–Hall, Englewood Cliffs, 1988).

(List continued on next page.)

*Primary Examiner*—Douglas W. Olms
*Assistant Examiner*—Ajit Patel
*Attorney, Agent, or Firm*—Volpe and Koenig, P.C.

[57] ABSTRACT

A CATV interference cancellation system reduces the presence of undesirable narrowband interference that corrupts return signal transmissions. The cancellation system first acquires a reference signal that contains components related to the interference present in the return signal. The reference signal is processed to derive estimates of the interference components appearing in the return signal and a cancellation signal is generated. The interference cancellation signal is then combined with the return signal, thereby reducing the interference components present in it. The interference cancellation system is deployed at a CATV headend and time division multiple access techniques (TDMA) are used for return transmission. The reference signal is derived from monitoring time slots within a TDMA frame that contain predetermined transmission data. Preferably the predetermined data is the absence of data resulting in an idle time slot. These time slots may be temporarily idle, or may deliberately be left unused to provide a window to a "noise-only" component of the return path signal. The signal thus obtained is passed through the same RF processing stage as the composite return signal and subsequently sampled and digitized. Thereafter, spectrum estimation techniques are applied to the samples of the signal to determine the frequencies of the interfering signals. Once an estimate of the interference frequencies is obtained from the spectrum, the reference signal comprising the same frequencies may be synthesized.

56 Claims, 8 Drawing Sheets

U.S. PATENT DOCUMENTS

| | | | |
|---|---|---|---|
| 5,046,133 | 9/1991 | Watanabe et al. | 455/138 |
| 5,049,890 | 9/1991 | Hansen | 342/384 |
| 5,109,533 | 4/1992 | Mine et al. | 455/63 |
| 5,115,454 | 5/1992 | Kucar | 375/77 |
| 5,117,505 | 5/1992 | Talwar | 455/278.1 |
| 5,125,108 | 6/1992 | Talwar | 455/278.1 |
| 5,133,017 | 7/1992 | Cain et al. | 381/71 |
| 5,140,699 | 8/1992 | Kozak | 455/84 |
| 5,148,117 | 9/1992 | Talwar | 330/151 |
| 5,199,048 | 3/1993 | Wakabayashi | 455/305 |
| 5,208,837 | 5/1993 | Richey | 375/103 |
| 5,225,902 | 7/1993 | McMullan, Jr. | 358/86 |
| 5,260,707 | 11/1993 | Goldman | 342/16 |
| 5,319,636 | 6/1994 | Long et al. | 370/32.1 |
| 5,349,609 | 9/1994 | Tsujimoto | 375/100 |
| 5,383,224 | 1/1995 | Mizoguchi | 375/99 |

OTHER PUBLICATIONS

Elias Masry et al., Spectral Estimation of Continuous-time Processes: Performance Comparison Periodic and Poisson Sampling Schemes, IEEE Transactions on Automatic Control, vol. AC-23, No. 4, 679-685, (Aug. 1985).

Farokh Marvasti, Advanced Topics in Shannon Sampling and Interpolation Theory, Chap. 4 Nonuniform Sampling, 121-155 (R.J. Marks II Ed., Springer-Verlag, NY 1993).

James J. Clark et al., A Transformation Method for the Reconstruction of Functions from Nonuniformly Spaced Samples, IEEE Transactions On Acoustics, Speech, and Signal Processing, vol. ASSP-33, No. 4, 1151-1165 (Oct. 1985).

Bernard Widrow et al., Adaptive Noise Cancelling: Principles and Applications, Proceedings of the IEEE, vol. 63, No. 12, 1692-1716 (Dec. 1975).

Don R. Hush and Bill G. Horne, Progress In Supervised Neural Networks, What's New Since Lippmann?, IEEE Signal Processing Magazine, 8-39 (Jan. 1993).

Saleem A. Kassam and Inhyok Cha, Radial Basis Function Networks In Non-Linear Signal Processing Applications, Proceedings Of The 1993 Asilomar Conference, 1021-1025.

C.F.N. Cowan and P.M. Grants, Adaptive Filters, (Prentice-Hall, Englewood Cliffs, 1985).

J.L. Yen, Nonuniform Sampling Of Bandwidth-Limited Signals, IRE Transactions On Circuit Today, 251-257.

J.B. Roberts et al., Spectral Analysis Of Randomly Sampled Signals Using a Correlation-Based Slotting Technique, IEEE Proceedings, vol. 133. No. 2, 153-162 (Apr. 1986).

INTERFERENCE CANCELLATION SYSTEM FOR CATV RETURN TRANSMISSIONS

BACKGROUND OF THE INVENTION

1. Field of the Invention

This invention relates generally to cable television communication systems. More particularly, the invention relates to a cable television system which implements a method of canceling interference manifest on the return transmission path in a two-way cable television communication system.

2. Description of the Related Art

A number of different types of cable television (CATV) communication systems exist to provide a broad array of CATV services. Conventional one-way CATV systems primarily provide broadcast video services, which are sent over the CATV cable link in a downstream direction, from the headend of a CATV system to a plurality of subscriber units.

Bidirectional CATV systems have become increasingly common in the industry as the diversity of services has grown. Pay-per-view channels are one example of bidirectional CATV services where the subscriber transmits information back to the headend regarding show selection.

Bidirectional CATV systems support both downstream and return path communication. Accordingly, individual subscribers may communicate with the headend, other subscribers, or service providers within the system. These systems also permit subscribers to select specific video programming or consumer services and pay only for those services which are used.

Typical CATV systems are capable of transporting a range of frequencies from approximately 5 megahertz to 750 megahertz. Signal frequencies above 50 megahertz are commonly reserved for distributing signals in the downstream direction from a headend to subscriber settop terminals. Signal frequencies below 50 megahertz are commonly reserved for transporting signals in the return path direction from individual subscriber settop terminals to the headend.

In transmissions from the headend to a particular subscriber settop terminal, the CATV signal is susceptible to interference along a discrete path defined via the trunk, branch, and drop lines of the CATV system. However, return signals are subject to more serious interference due to the combination of all the return signals being sent via the system drop lines and branch lines and combined in the trunk line over which the headend receives a composite signal. Additionally, return signals are also more susceptible to interference because the frequency bandwidth used in the return path transmissions overlaps with the frequency bandwidth of off-the-air broadcast signals which propagate around the world.

In CATV systems there are three broad categories of interference: 1) sporadic interference such as noise from lightening, switching, and ground faults; 2) common mode distortion from nonlinearities within the CATV system; and 3) ingress of narrowband off-the-air broadcast interference.

Coaxial cable is commonly used for transmission lines in CATV systems. Although coaxial cable is shielded, CATV systems may contain coaxial cables that are poorly grounded, have cracked or split shields, or that have high-impedance, oxidized connections which allow noise and interference to enter the signal carrying conductor. Coaxial cables in the subscriber's home of poor quality and cables left unterminated similarly contribute to interference along with aging signal splitters and cables in the signal path.

Off-the-air broadcast signals manifest themselves in the form of stationary narrowband interference. Many of these signals are quasi-continuous in nature and vary in frequency and phase slowly over time. If the interference is co-located with the return signals transmitted during bidirectional communications, the result can be a severe degradation in the quality of the return signals. Often, it is then necessary to repeat the transmission of information that is lost due to errors in the return signal.

The headend receives the return signals transmitted from the subscriber units combined with interference. In order to facilitate communications it is desirable to recover the subscriber unit signals intact from the composite signal and interference.

SUMMARY OF THE INVENTION

The CATV interference cancellation system of the present invention reduces the presence of undesirable narrowband interference that corrupts return signal transmissions. The cancellation system first acquires a reference signal that contains components related to the interference present in the return signal. The reference signal is processed to derive estimates of the interference components appearing in the return signal and a cancellation signal is generated. The interference cancellation signal is then combined with the return signal, thereby reducing the interference components present in it.

In a first embodiment, the interference cancellation system is deployed at a CATV headend and time division multiple access techniques (TDMA) are used for return transmission. The reference signal is derived from monitoring time slots within a TDMA frame that contain predetermined transmission data. Preferably the predetermined data is the absence of data resulting in an idle time slot. These time slots may be temporarily idle, or may deliberately be left unused to provide a window to a "noise-only" component of the return path signal. The signal thus obtained is passed through the same RF processing stage as the composite return signal and subsequently sampled and digitized. Thereafter, spectrum estimation techniques are applied to the samples of the signal to determine the frequencies of the interfering signals. Once an estimate of the interference frequencies is obtained from the spectrum, the reference signal comprising the same frequencies may be synthesized.

In an alternative embodiment, the reference signal is acquired through monitoring the external environment of the cable return path by means of an antenna. Since the interference on the cable return path is highly correlated with off-the-air broadcast signals, a reference signal strongly correlated with the interference present on the cable plant may be generated. The interference cancellation system utilizing an antenna may be located anywhere in the return path of a CATV plant to cancel localized interference.

For greater effect, this alternative processing can be used in advance of the first embodiment method. The alternative processing may be conducted proximate where known local interferers broadcast which may be remote from the CATV headend and other subscribers in the CATV system.

To derive estimates of the interference components present in the return signal from the reference signal, several linear/non-linear filter structures are utilized in different embodiments based on the relationship between the interference components present in the return and the reference signals. The reference signal is fed into multiple digital filtering units governed by parameters that are adjusted adaptively to generate estimates that are subtracted from the return path signal to suppress the interference components present therein.

Accordingly, it is an object of the present invention to provide a system for canceling interference manifest on CATV return path.

It is a further object of the invention to provide a method of interference cancellation whereby a reference signal is obtained from the samples obtained from a "noise-only" signal acquired by monitoring idle time slots in the TDMA communication architecture of a CATV system.

It is a further object of the invention to provide a method of interference cancellation whereby a reference signal is acquired by means of a local antenna.

Other objects and advantages of the system and method will become apparent to those skilled in the art after reading the detailed description of the preferred embodiment.

DETAILED DESCRIPTION OF THE PREFERRED EMBODIMENT

Figure 1:
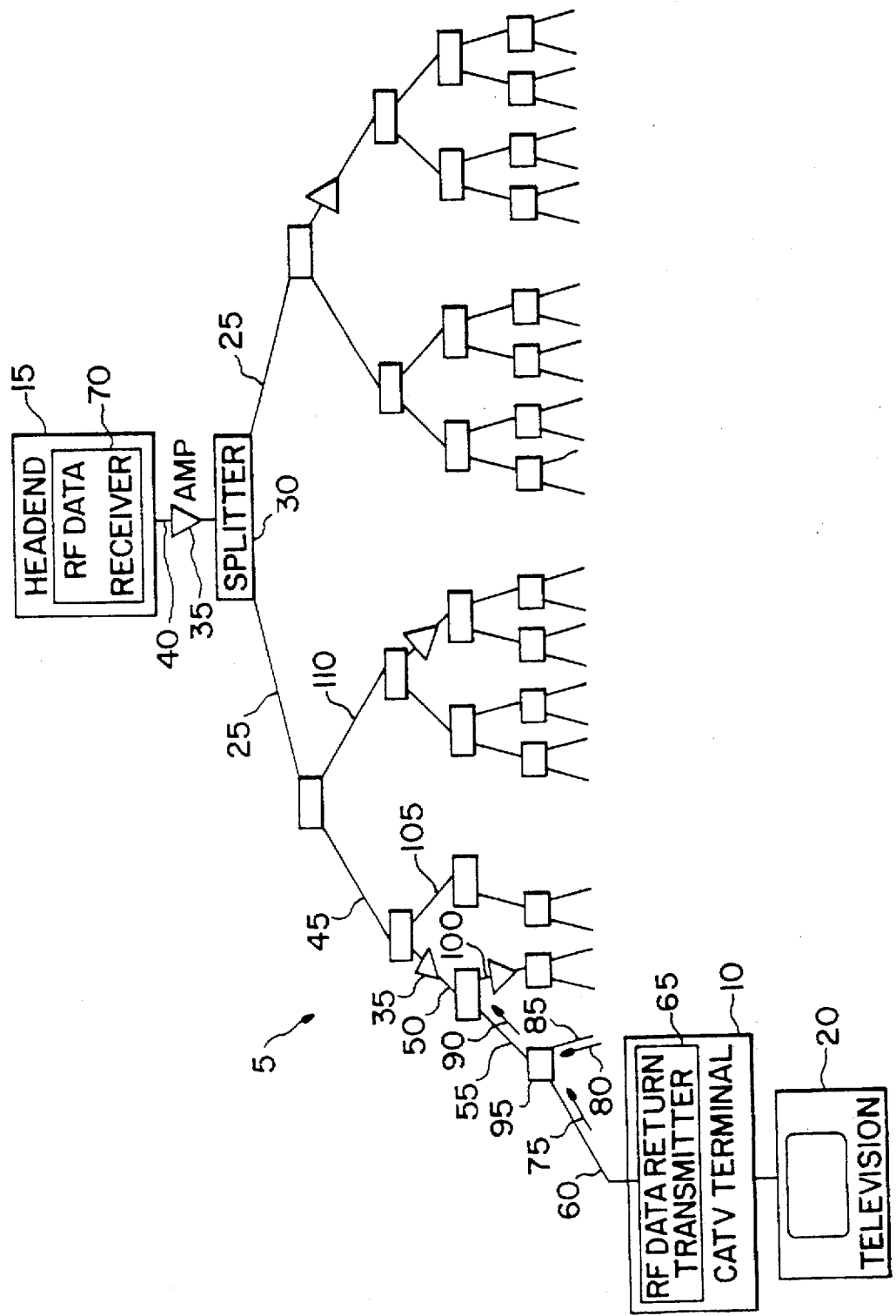
FIG. 1 is a block diagram illustrating a typical CATV distribution plant.

In FIG. 1, the topology of a typical CATV distribution plant 5 for distributing cable television signals downstream to a subscriber and for receiving return path messages from a subscriber settop terminal 10 is shown. The CATV plant 5 connects a headend 15 to a multiple subscriber's televisions 20 through settop terminals 10. The CATV plant 5 architecture follows a tree-and-branch 25 structure. The headend 15 is at the top of the tree and the settop terminals 10 are located throughout the trunk and branches. The distribution plant 5 begins with a coaxial or fiber optic trunk line 40 coupled to the headend 15. Some portions of the CATV plant may use optical fiber cables instead of coaxial transmission cables. The benefits of fiber optic transmission are that bandwidths over several gigahertz can be transmitted with line losses much less then those of coaxial cables. Also, optical fiber does not act as an antenna for RF interference or impulsive noise. However, since optical fiber is not used exclusively in the CATV plant, noise present on existing coaxial cables will still affect the quality of transmission.

At points where the coaxial transmission cable divides, signal splitters/combiners 30 are installed. Drop lines 60, branch lines 25, 45, 50, 55 and trunk line 40 provide the bidirectional transport medium between the headend 15 and settop terminal 10 within the CATV system. All are suscep-
tible to ingress. The CATV subscribers typically receive the same broadband CATV signal sent from the headend 1B. Signal amplifiers 3B are distributed throughout the cable plant 5 to boost a transmitted signal and ensure that nominal signal strength levels are maintained. Signal boosting amplifiers 35 are capable of bidirectional amplification.

A frequency agile RF data return transmitter 65 is included in the settop terminal 10 and allows a subscriber to communicate with the headend 15 by transmitting messages in the return direction in the CATV plant B. The headend 15 includes a frequency agile RF data receiver 70 for receiving messages transmitted by multiple return transmitters 65.

Downstream transmissions from the headend 15 to the CATV settop terminal 10 are susceptible to noise introduced along the trunk 40, branches 25, 45, 50, 5B, and drop lines 60. Due to the tree-and-branch topology of a CATV plant, noise ingress from all locations on a cable plant 5 accumulates at the headend 15. This noise funneling affects return signal transmissions far more than those in the downstream case. For instance, the interference 75 and 80 on lines 60 and 86, respectively, will combine into the interference 90 at signal splitter 95 connected to drop line 60 and branch 85. As the signals travel toward the headend 15, the noise will be further combined with noise on branch lines 100, 105, 25 and every other line in the CATV plant 5. Due to this noise accumulation, it can become difficult to discriminate a data signal at the headend 15 from the accumulated noise.

Noise can include impulse noise, common mode distortion, and ingress of off-the-air broadcasts. Although CATV plants use shielded cables and optical fiber to a limited extent, faulty cable shields and grounds allow noise to enter into the CATV plant. Aging signal splitters 95 or old, nonlinear amplifiers 35 may also cause interference noise. The present invention focuses on canceling the relatively stationary narrowband interference manifest on the return path of a CATV plant.

Figure 2:
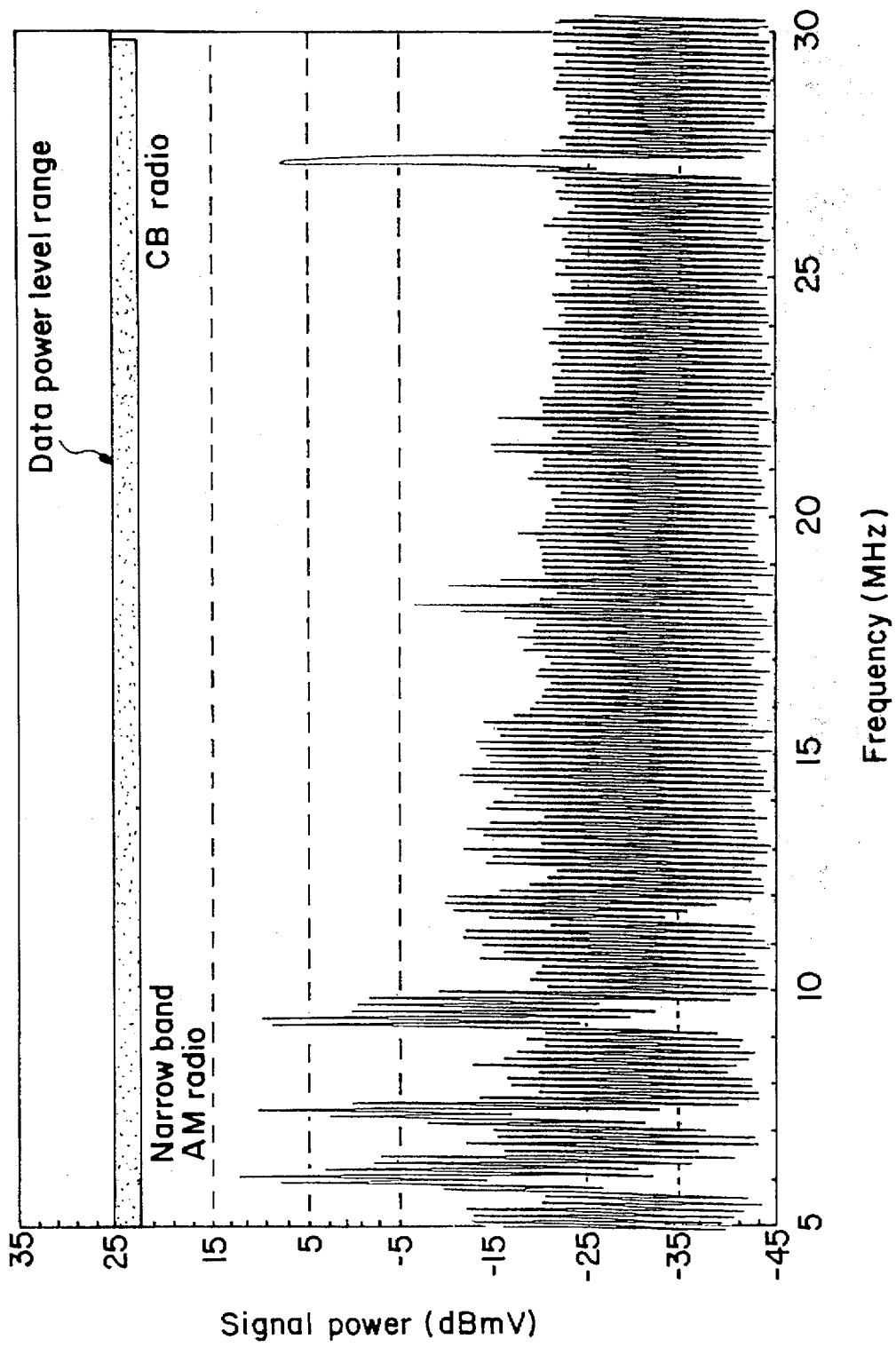
FIG. 2 is a plot of power level versus frequency from 5 to 30 megahertz of typical narrowband interference manifest on CATV return path signals.

Ingress from off-the-air broadcasts and amateur radio communication is shown in FIG. 2. FIG. 2 shows the return path spectrum measured at the headend 15 in the absence of active signal transmissions. Shortwave broadcasts can be seen at 9.5 megahertz and 18 megahertz. Also seen is a citizen band operator broadcasting at 27 megahertz. This form of narrowband ingress changes in composition as the broadcast frequencies suitable for transmission change. High frequency (HF) signals travel around the world by multiple reflections from the ionosphere. Changes in the ionosphere that occur during the day as well as due to sunspot activity determine the lowest and the maximum usable frequency (LUF and MUF) for transmission. Although changing with time, this kind of interference can still be classified as relatively stationary. The interference cancellation system of this invention focuses on cancelling this particular form of interference.

Figure 3:
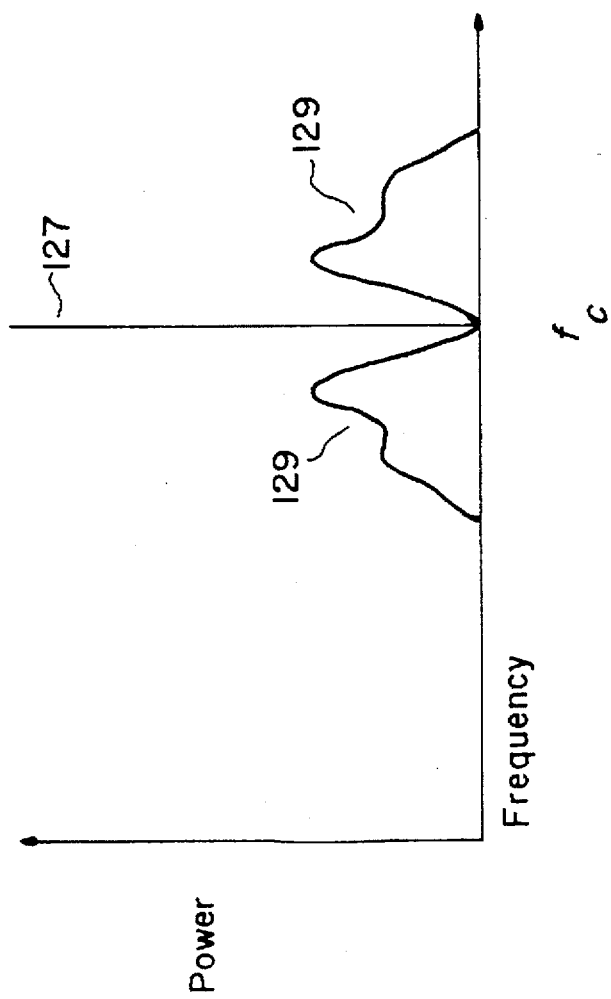
FIG. 3 shows the representative voice-modulation spectrum of a typical AM shortwave carrier frequency with sidebands.

FIG. 3 shows the signal spectrum of a typical voice-modulated AM (amplitude modulation) signal. A signal consisting of speech is sent on a frequency channel by having it modulate a radio frequency "carrier." Most of the power is in the carrier 127 which conveys no information. The symmetrical sidebands 129 convey identical information causing the signal to occupy twice the bandwidth actually needed. However, the sidebands 129 only contain approximately 1/16 of the power contained in the carrier.

Figure 4:
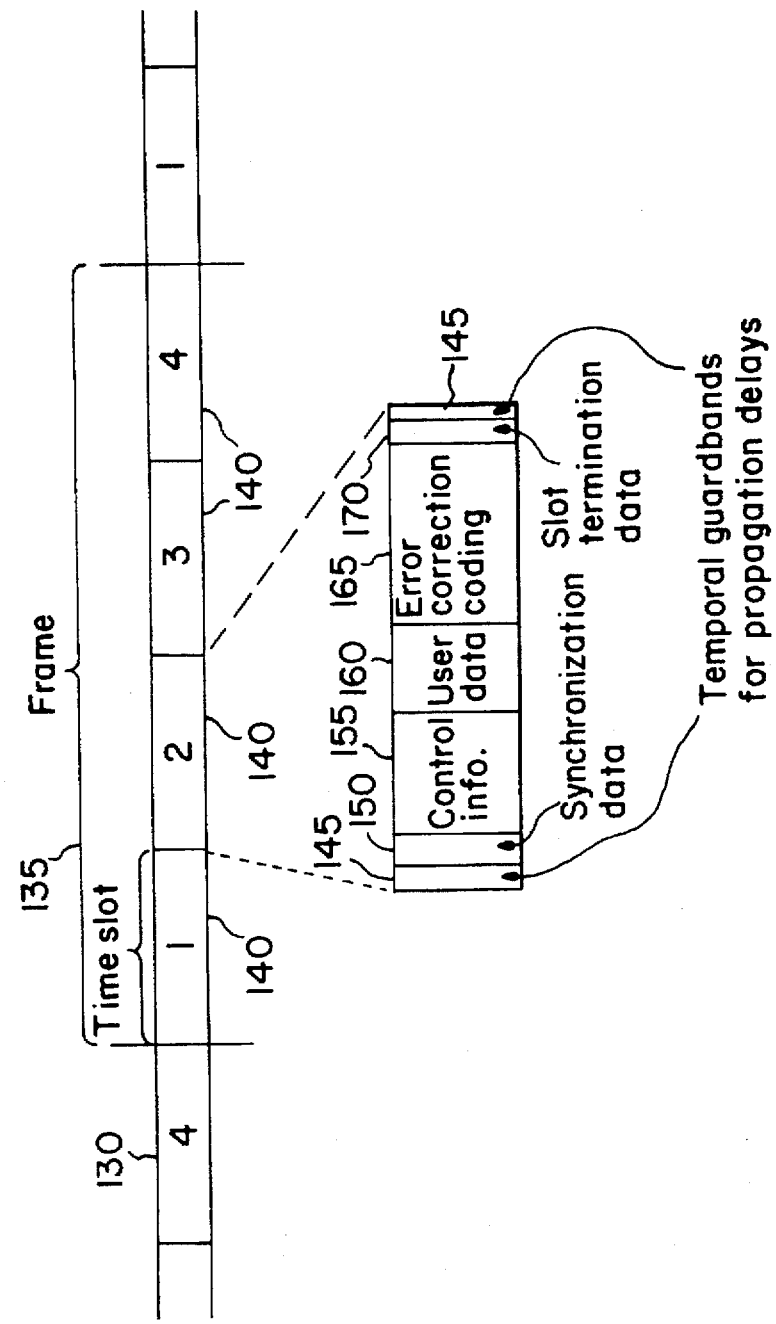
FIG. 4 is the frame format used in a CATV TDMA architecture.

In FIG. 4, a typical slot structure 130 utilized within the TDMA architecture used for CATV return transmissions is shown. The TDMA slot structure 130 carries analog RF transmissions from multiple subscribers and comprises clocked, continuously repeating time frames 135 which are further divided into a number of different time slots 140. Each time slot 140 comprises temporal guard bands for propagation delays 145, synchronization data 150, control information 155, user data 160, error correction coding 165 and time slot termination data 170. Each time slot 140 can convey a response 160 or information 160 from a subscriber to the headend 15. One example of a TDMA architecture utilizes a return system utilizes a frame structure of 1.024 seconds in duration, comprising 512 time slots, each 2 milliseconds wide. This provides an overall data rate of 256 kilobits per second in a bandwidth of 192 kilohertz.

Figure 5:
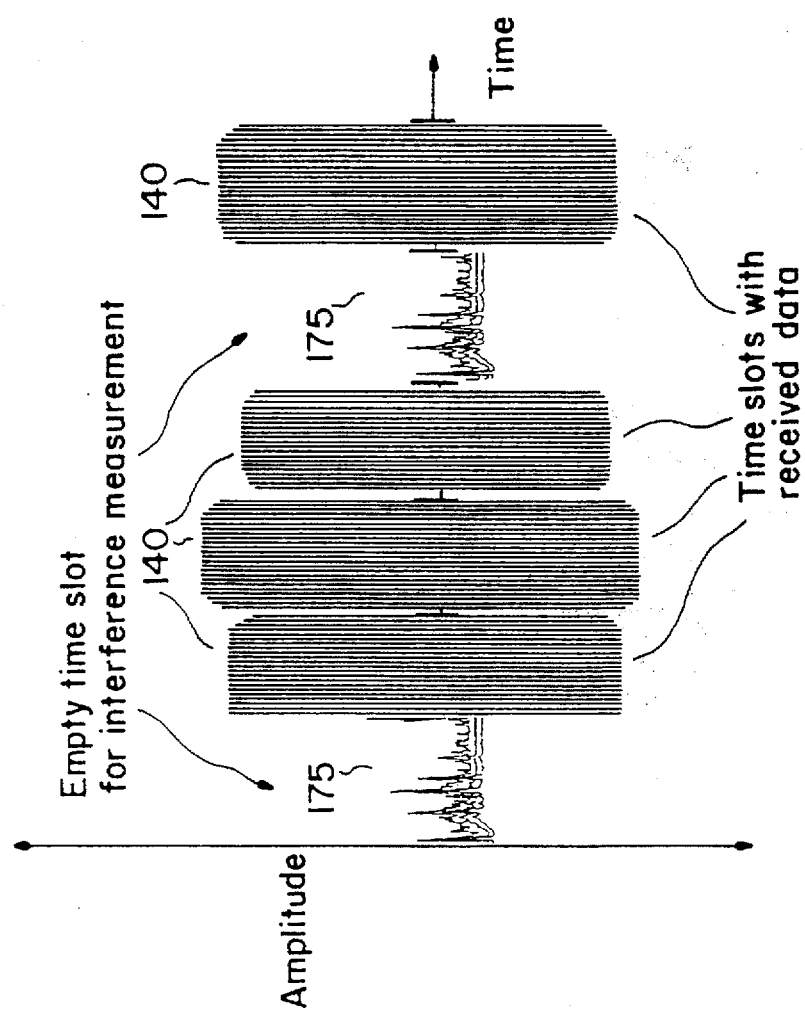
FIG. 5 is the frame format showing idle time slots used for the generation of the reference signal in accordance with the present invention.

The present invention utilizes this architecture to generate the reference signal that has frequency components related to the interference. Referring to FIG. 5, a frame of TDMA time slots 140 with received data and an idle or deliberately unused time slot 175 with the noise spectra is shown. Time slots 140 typically contain a subscriber's response to a CATV programming query with superimposed interference. However, when a subscriber transmits no response, only the noise present on the return system is received by the headend 15. To derive a reference signal for the interference present on the return system the time slots where no subscriber response is present 175 are examined. The noise signals present are sampled and quantized. Sampling may be carried out after the signal has passed through the RF processing stage and the baseband signal has been recovered. For simple modulation techniques such as binary PSK (phase shift keying) the RF processing yields a real signal. However, when quadrature modulation techniques such as QPSK are employed, a complex bivariate signal is obtained at the output consisting of the inphase and quadrature components. Extension to the bivariate case is simple if the same processing is carried out for each signal component. Filter structures usable with bivariate complex data are well known to those skilled in the art.

The sampling rate $f_s$ used to obtain a discrete time signal should be in conformance with the Nyquist sampling criterion when utilizing uniform sampling within the time slots. The Nyquist theorem for uniform sampling procedures states that a finite bandwidth signal (with maximum frequency of $f_{max}$) may be recovered from its samples by low pass filtering, with a filter of bandwidth $2f_{max}$ if the sampling frequency is greater than $2f_{max}$. If the Nyquist rate is not maintained, aliasing due to undersampling will occur, whereby higher frequencies are folded back near the zero frequency causing distortion in the signal. If 200 kilohertz channels are utilized for TDMA transport then a sampling rate of 4 to 8 times $f_{max}$, 800 kilohertz to 1.6 megahertz is suitable for acquiring signals.

Figure 6:
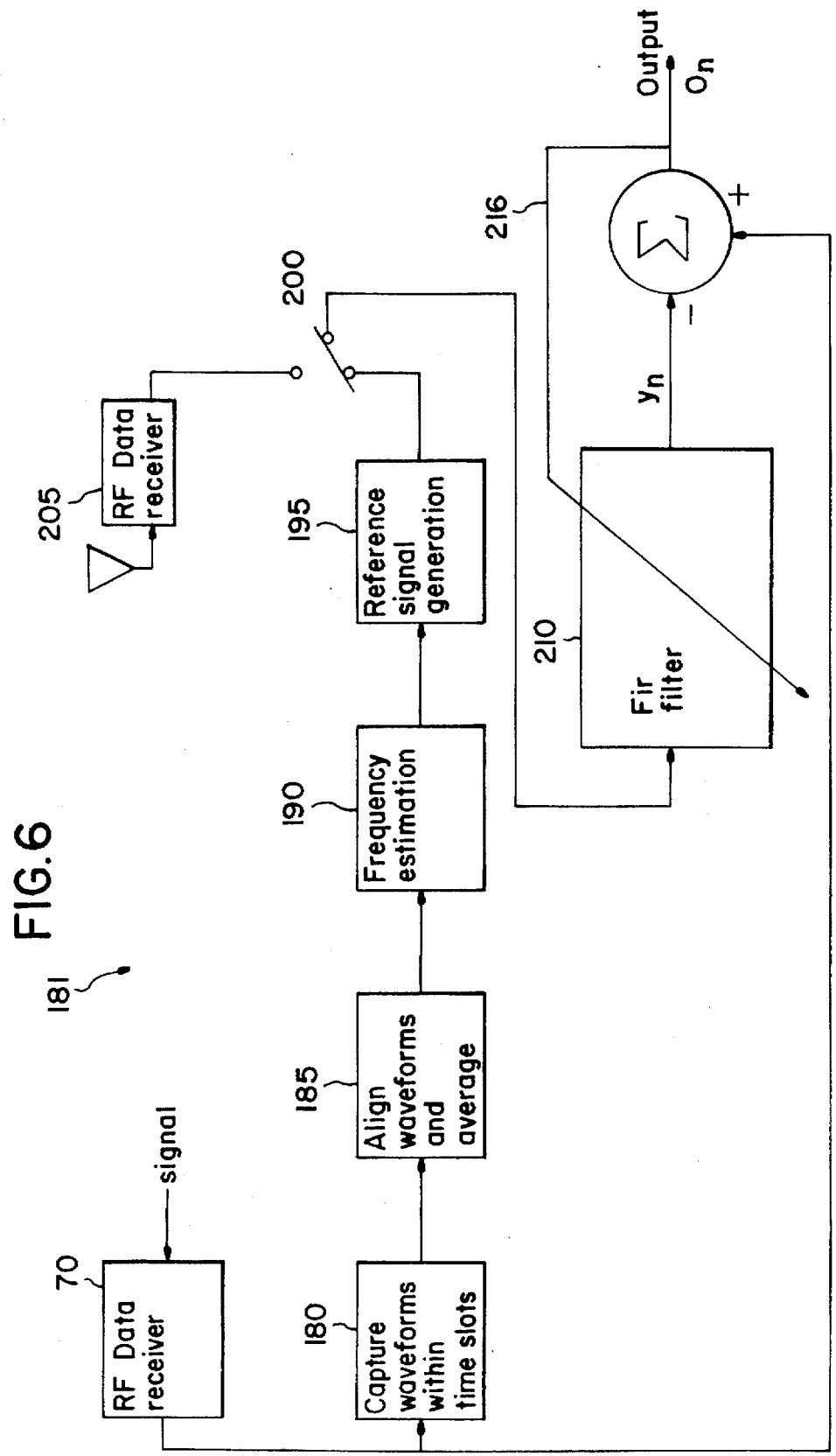
FIG. 6 is a block diagram showing the preferred embodiment of the present invention.

The interference cancellation system 181 of the present invention is shown in FIG. 6. The RF receiver 70 converts the received signal into its baseband equivalent. Samples of the 'noise-only' signal are obtained periodically from idle time slots 175 with a period T along with the necessary synchronization data 150 as shown in FIG. 4.

Returning to FIG. 6, the signal within an idle time slot is captured by a sample-and-hold circuit, and an A/D (analog-to-digital) conversion takes place 180 at the Nyquist rate described above. In each time slot y data samples are captured at the sampling rate fs. The y data samples, characterizing the signal within a single time slot, are stored in memory.

If an attempt was made to generate a frequency spectrum from the data obtained from a single time slot by computing a discrete Fourier transform of the y data samples, frequency components within fs/y Hz could not be resolved. This results because only a finite segment of the signal is viewed to generate the spectrum and is referred to as the "windowing" effect. See S. Kay, "Modern Spectral Estimation, Theory and Applications," Prentice-Hall Englewood Cliffs, 1988.

To obtain a signal capable of yielding estimates with higher resolution, longer data segments are desirable. As the interference frequencies are relatively stationary, the signal in successive idle time slots remains coherently related. The present invention utilizes the coherency of the interference signal present in different time slots to obtain a longer data segment via phase alignment of successive data segments that are T units apart. To gather sufficient number of samples for this procedure, samples from L idle time slots, each spaced T units apart, are obtained and stored in memory (a total of Ly samples).

Figure 7:
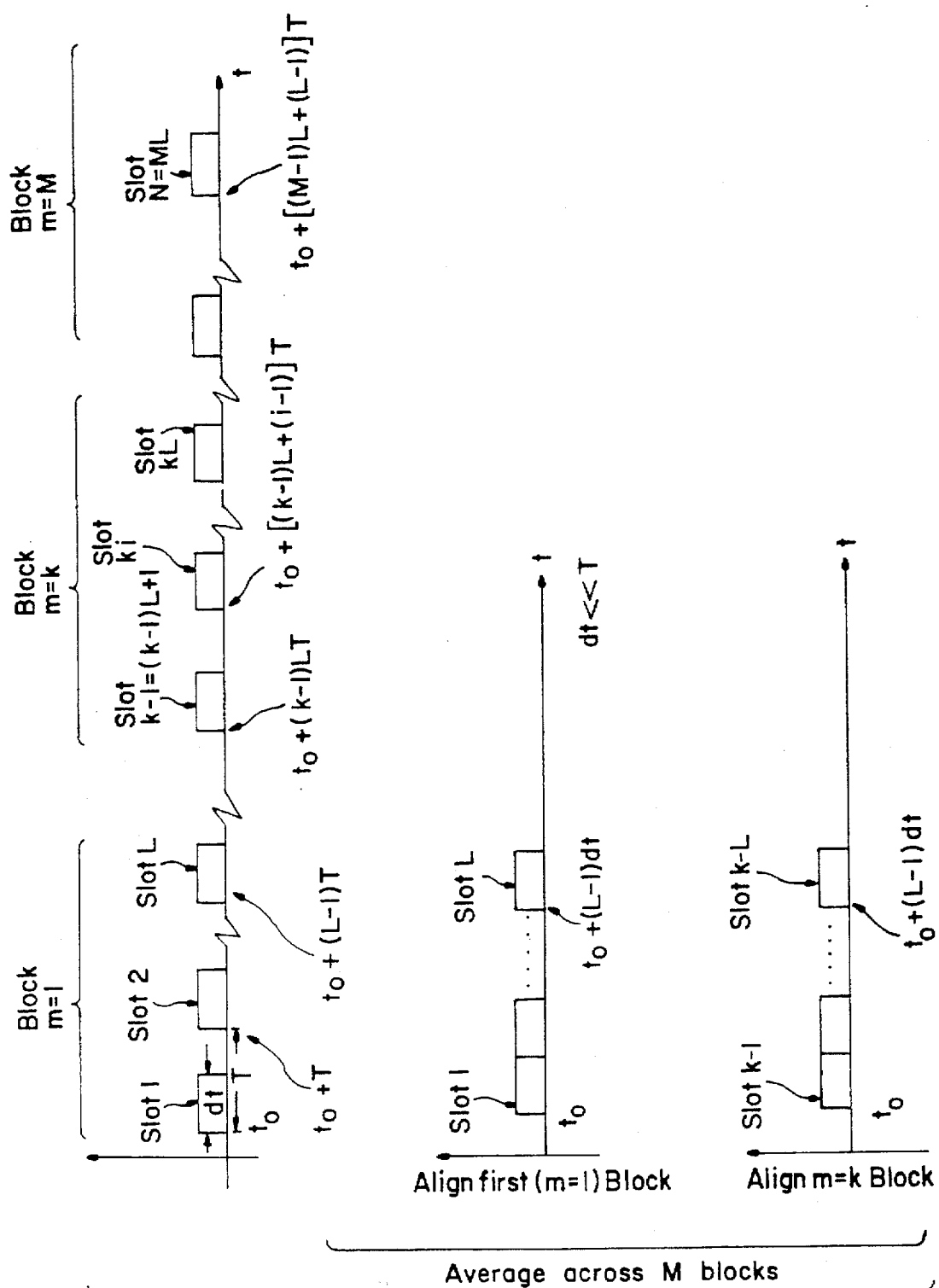
FIG. 7 is a plot showing the aligning phase of the interference signal.

Coherency of the interference signal allows for another enhancement to the spectrum estimate: increased signal to noise ratio (in this case interference to other types of noise) may be obtained if spectrum obtained from M data segments, each obtained from L time slots and Ly samples in length, are exactly aligned with each other and averaged as shown in FIG. 7. Therefore in the time slot monitoring stage 180, the interference-only signal is captured in a total of N time slots indexed by m,I (I=1, ..., L and m=1, ..., M) over a time period NT+dt (dt <<T is the duration of each time slot). Here N=LM, where, N=total number of sampled time slots, L=the number of time slots in a group used for constructing longer data segments, M=number of groups comprising L time slots, that are used for averaging The alignment/averaging operation proceeds as follows. A total of N DFTs (discrete Fourier transforms) are computed from the data points obtained within each of the N time slots. To obtain the DFT of the first group comprising of L aligned slots to be used for averaging (m=1), the samples obtained in slots I=1, ...L captured at time instants $t_0+(I-1)T$ aligned with time instants starting at $t_0+(I-1)dt$ respectively. This alignment is done in the frequency domain by applying a phase correction factor of $$e^{-j2\pi f(I-1)(T-dt)}$$

to the DFT of data points obtained within the $I^{th}$ time slot in the first group of time slots (m=1). The overall DFT of length Ly is obtained by summing and normalizing the individual phase-aligned DFTs.

For reconstructing the DFT of the m=$k^{th}$ block of data, data captured in the L time slots captured at time instants $t_0+[(k-1)L+(I-1)]T$ (I=1, ..., L) is aligned at time instants $t_0+(I-1)dt$ (I=1, ..., L) by applying a phase correction factor of $$e^{-j2\pi f[(k-1)LT+(I-1)(T-dt)]}$$

to the DFT of the data obtained in the $kI^{th}$ time slot. The overall DFT of the $k^{th}$ block of Ly data points is obtained as before by summing and normalizing the individual phase-aligned DFTs. The M DFTs providing higher resolution spectral estimates are then averaged to improve signal-to-noise ratio. In the preferred embodiment, the typical values for L and M are 2 and 10 respectively.

If procedures other than Fourier transform techniques are to be utilized for generating spectral estimates, time domain data is easily obtained by computing the inverse Fourier transform of the phase aligned DFT segments.

The spectrum thus obtained is then used to estimate the interference-only frequency components 190. A thresholding procedure is used to declare the presence of a given frequency. Information regarding the signal levels used for return transmission is utilized to detect interference frequencies. The presence of an interfering frequency is declared if the magnitude of the spectrum at a given frequency exceeds a threshold value which is set empirically.

Since a finite data segment is used to generate the spectral estimate, the windowing effect spreads out the spectrum of a pure sinusoid and care must be taken to insure that the presence of multiple frequencies is not declared for a single frequency present in the interference spectrum. This is achieved by dividing the frequency axis into bins. The width of each bin is determined by the resolution afforded by the data segment used for computing the spectrum. Within each bin, the magnitude of each frequency is compared to the threshold value. Among the frequencies whose magnitude exceeds the given threshold, the one corresponding to the maximum magnitude is declared to be the interfering frequency. All frequencies deemed interferers are fed into the reference signal generator 195, which produces a reference signal consisting of these particular frequencies. The samples generated by the reference signal are at the same rate as those obtained for the return signal. The reference signal is fed into a switching means 200 that may subsequently feed it into the adaptive FIR filter 210.

There is a delay of approximately N frames from time $t_0$ (corresponding to the total number of sampled time slots) before the reference signal is available and interference cancellation can begin. The reference signal is then generated every N frames. The amplitude and phase of the frequencies present within the reference signal are set to an initial value arbitrarily. The exact amplitude and phase of the interference is learned by the adaptive techniques (the adaptive FIR filter 210 in the preferred embodiment).

In another embodiment, spectral estimates can be generated from data samples obtained at random temporal points if several time slots become available to provide aperiodic samples on a random sampling grid. See E. Masry et. al. "Spectral estimation of continuous-time processes: performance comparison between periodic and Poisson sampling schemes," *IEEE Trans. on Automatic Control*, vol. AC-23, no. 4, August 1985. Frequency estimates are then derived from the spectrum in a manner similar to that discussed above.

In yet another alternative embodiment the reconstruction of the reference signal may be carried out if the overall "noise-only" signal obtained from monitoring time slots spaced T units apart may be viewed as a special case of a non-uniformly sampled signal, where uniform samples are acquired for a duration dt, periodically with a period of T units. To generate samples of the reference signal at time instants where the actual return signal is measured, the signal values of the reference signal at time instants other than where samples were acquired must be reconstructed. Sampling theorem for the case of band-limited non-uniformly sampled signals dictates that if the average sampling rate exceeds the sampling rate prescribed by the Nyquist theorem, the entire signal may be reconstructed from its samples by employing suitable reconstruction filters. See F. Marvasti, "Nonuniform sampling," in *Advanced Topics in Shannon Sampling and Interpolation Theory*, R. J. Marks II Ed. Springer-Verlag, New York 1993. If the duration of the TDMA frame is T seconds and the duration of each time slot is dt seconds, then number of time slots within each frame is T/dt. The sampling rate thus needs to be greater than T/dt times the Nyquist sampling rate in order to recover the signal from its samples. A theorem governing signal reconstruction from band-limited samples states that as long as the sampling function is such that there exists a one-to-one and invertible function that will transform the non-uniform sampling grid into a uniformly spaced sampling grid, it is possible to employ the reconstruction function used in the uniform sampling situation with appropriate modifications to recover the signal from its samples. See J. Clark et. al., "A transformation method for reconstruction of functions from nonuniformly spaced samples," *IEEE Trans. on Acoustics, Speech and Signal Processing*," vol. ASSP-33 no. 4, October 1985. Such a function for the sampling grid employed in the present invention is available.

As an alternative to measuring the interference on the cable return transmission path via signals obtained from idle or unused time slots within a TDMA architecture, monitoring of off-the-air broadcasts via an external antenna can also be used. The signals in the 5–40 megahertz range in the return path are usually identical to those observed coming from the antenna 205.

A switching means 200 is provided for choosing between the reference signal obtained via TDMA time slots and that obtained through an external antenna. A control means determines which signal will be processed as the interference reference signal. The control means can be a simple multiple pole switch, or a software switch controlled by the success of the FIR filter adaptation. Depending upon the iterative process used to determine the filter weights, a control scheme could alternate between interference signal sources to determine which has the higher degree of success during adaptation. The source yielding the best filter output would be chosen and then input to the adaptive filter of the interference cancellation system.

Figure 8:
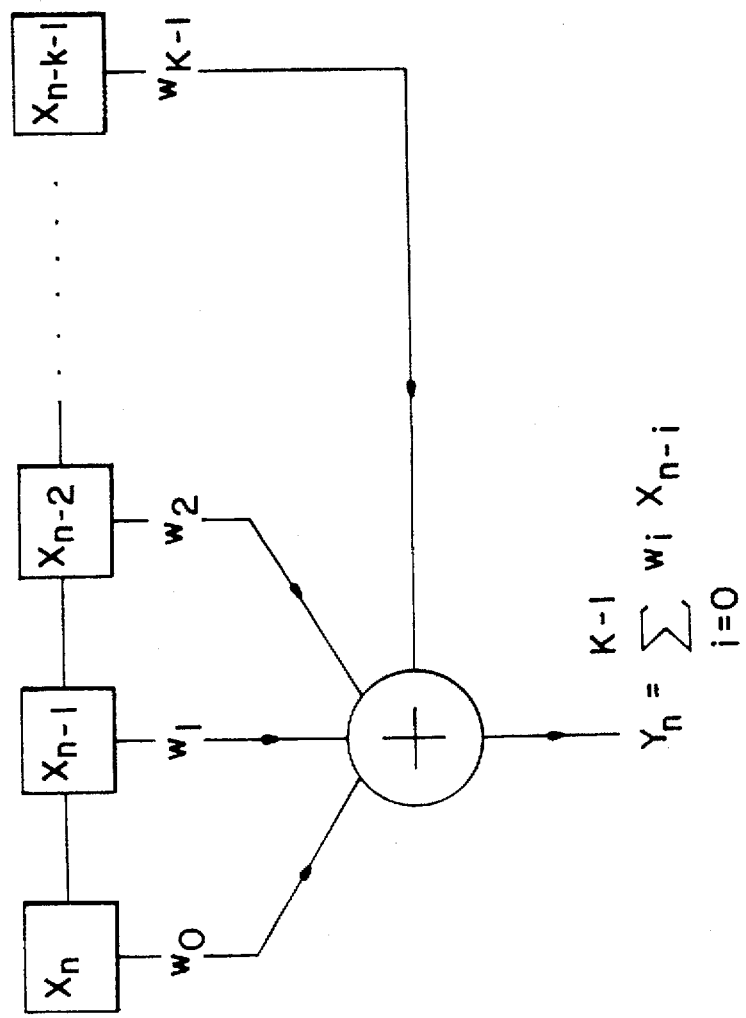
FIG. 8 is a system diagram of the Finite Impulse Response filter.

In the preferred embodiment the reference signal is fed into an adaptive finite impulse response (FIR) filter 210 which at discrete time instant n, takes K samples at time instants n, n-1, . . . , n-K-1, of the reference signal and forms an output of a weighted sum of the K input samples. The system diagram of a FIR filter is shown in FIG. 8.

The output of the FIR filter which corresponds to an estimate of the interference signal contained in the return signal is subtracted from the waveform containing the return path signal plus interference to obtain the final output (through 21B) $O_n$ as shown in FIG. 6. The output $O_n$ also serves as a feedback 216 to the FIR filter. The FIR filter uses the feedback signal 216 to continuously adapt the filter weights. Initially, the estimates of the interference signal produced by the FIR filter do not match the actual interference signal. As the filter weights are updated at each successive time instants, improved estimates are obtained. The least mean squares (LMS) algorithm is used to obtain the weight updates. The LMS algorithm adjusts the weights such that the overall energy in the output signal is minimized. When the desired signal is uncorrelated with the reference signal the energy in the desired signal is not affected by the cancellation process, which only serves to reduce the energy in the interference signal. The LMS algorithm is based on the stochastic gradient technique for solving the minimization problem. See B. Widrow et. al. "Adaptive noise canceling: Principles and Applications," *Proceedings of the IEEE* vol. 62, no. 12, pp. 1692–1716, Decemeber 1975. In this algorithm the weights of the FIR filter are initialized to zero. The tap weight $w_i$ at time instant n, is updated for time n+1, by adding to it a certain proportion governed by the step-size μ of the product of the input sample $x_{n-i}$ and the difference between the feedback signal and the output of the FIR filter, $(O_n-Y_n)$.

For the weights to converge to some average value, the step-size of the LMS algorithm, μ where 0<μ<1, must be less than $2/\lambda_{max}$, where $\lambda_{max}$ is the largest eigenvalue of the reference input autocorrelation matrix. Typically, μ is set to be a very small value, (e.g., μ<<0.1), but this could result in slow convergence of the iterative algorithm. The parameter μ can also be set by computing the eigenvalues of an estimate of the correlation matrix derived from the samples of the reference signal. This is computationally intensive and need only be done occasionally after every N time frames.

The other parameter that requires selection is the number of taps (K) employed by the FIR filter. This is fixed to be one more than twice the number of interfering frequencies present.

In an alternative embodiment, a recursive IIR (infinite impulse response) filter replaces the FIR filter. In this alternative embodiment, in addition to the K input samples corresponding the reference signal, K past values of the output are also combined through appropriate weights to form an estimate of the interference signal. Since the IIR filter uses as its input the value of its own output in addition to the value of the signal being filtered, the IIR filter can exhibit instability. However, the values of K and K' are much less than used by an FIR filter. Training algorithms for an adaptive IIR filter are available for this application.

In situations where the reference signal is related to the interference signal corrupting the desired signal in a non-linear fashion, a linear filter will be unable produce an accurate estimate of the interference signal by processing the reference signal. Such a situation may arise when the interference signal over the cable plant undergoes nonlinear distortion while the reference signal picked up by an antenna does not. In this embodiment, a nonlinear adaptive processing may be substituted for the above mentioned linear filters.

Two techniques are possible. An alternative embodiment utilizing a feed-forward neural network trained via a back propagation training algorithm can be used. See D. Hush and B. Horne, "Progress in supervised Neural Networks, what is new since Lippmann?" *IEEE Signal Processing magazine*, January, 1993. The other alternative embodiment is the RBFN (radial basis function network). The RBFN structure is simpler and easier to train when compared with a feed-forward neural network. See S. A. Kassam and I. Cha, "Radial Basis Function Networks in Non-Linear Signal Processing Applications," *Proceedings of the* 1993 *Asilomar Conference*, pp. 1021–1025.

In the above description, the presence of a real signal comprising a single component was assumed. However, if the signal is complex, such as a QAM (quadrature amplitude modulated) signal, the same processing may be performed for each component of the complex signal for reference signal generation. Filtering may also be performed independently for each component. Alternatively, an FIR filter with complex weights may be trained. The update equations are only modified slightly: The input samples are replaced by their complex conjugate, and the weights and the output of the FIR filter are complex valued. Convergence properties are similar to the case of a real signal. See Adaptive Filters, C. F. N. Cowan and P. M. Grant Eds., Prentice-Hall, Englewood Cliffs, 1985.

The preferred embodiment and alternative embodiments are realized with DSP microprocessors and application specific circuits in conjunction with parallel processing because of the high data rates well known. Data conversion and memory technology have advanced to the point at which low-cost solutions are commercially available.

While the present invention has been described in terms of the preferred embodiment, other variations which are within the scope of the invention as outlined in the claims below will be apparent to those skilled in the art.

I claim:

1. A method of canceling interference in a CATV return path signal that includes a time division multiple access data stream having a plurality of time slots within which frames of data are transmitted from subscriber units comprising the step:

acquiring an interference reference signal from the CATV return path;

selecting at least one time slot for use in evaluating interference;

sampling said selected time slot when predetermined data is transmitted therein;

processing said interference reference signal to produce an interference cancellation signal; and combining said interference cancellation signal with said CATV return path signal to cancel interference.

2. The method of claim 1 wherein said predetermined data is the absence of data such that the selected time slot is idle, and said sampling is performed on said idle time slot.

3. The method of claim 2 wherein the step of processing said interference reference signal comprises:

computing a discrete Fourier transform of the data resulting from said sampling of said idle time slot in each frame;

applying a phase correction factor to said discrete Fourier transforms of the data;

averaging said phase corrected discrete Fourier transforms;

estimating the frequencies of the interferers based on said averaged transforms; and generating an interference cancellation signal of said estimated frequencies.

4. The method of claim 3 wherein said processing of said interference reference signal further includes utilizing a feedback signal acquired downstream of said combined cancellation signal and return path signal.

5. The method of claim 4 wherein the processing of said interference reference signal further comprises:

using a finite impulse response filter to process said interference reference signal when related linearly with said return path signal; and training said finite impulse response filter with said feedback signal.

6. The method of claim 5 wherein the step of training said finite impulse response filter uses an adaptive least mean squares method algorithm.

7. The method of claim 5 wherein the step of training said finite impulse response filter uses a square root sum of the squares algorithm.

8. The method of claim 4 wherein the processing of said interference reference signal further comprises:

using an infinite impulse response filter to process said interference reference signal when related linearly with said return path signal; and training said infinite impulse response filter with said feedback signal.

9. The method of claim 4 wherein the processing of said interference reference signal further comprises:

using a feedforward neural network to process said interference reference signal when related nonlinearly with said return path signal; and training said neural network with said feedback signal using a back propagation algorithm.

10. The method of claim 2 wherein the processing of said interference cancellation signal further comprises:

using a radial basis function network to process said interference reference signal when related nonlinearly with said return path signal; and training said radial basis function network with said feedback signal.

11. The method of claim 2 wherein the step of sampling idle time slots is periodic.

12. The method of claim 2 wherein the step of sampling idle time slots is aperiodic.

13. The method of claim 2 wherein the step of sampling idle time slots is periodic with a higher sampling rate and reference signal generation is accomplished through reconstruction procedures suitable for non-uniform sampling schemes.

14. The method of claim 1 wherein the step of acquiring said interference reference signal is performed at a headend of a CATV system.

15. The method of claim 1 wherein the step of acquiring said interference reference signal is performed at a location remote from a CATV system headend and the method is also performed at said headend.

16. A method of canceling interference in a CATV return path signal comprising the steps:

acquiring an interference reference signal;

processing said interference reference signal using a finite impulse response filter when related linearly with said return path signal to produce an interference cancellation signal;

combining said interference cancellation signal with said CATV return path signal to cancel interference; and training said finite impulse response filter with a feedback signal acquired downstream of said combined cancellation signal and return path signal.

17. The method of claim 16 wherein the interference reference signal is acquired from the CATV return path.

18. The method of claim 16 wherein the steps of acquiring said interference reference signal is by means of an antenna.

19. The method of claim 16 wherein the step of acquiring said interference reference signal is performed at a headend of a CATV system.

20. The method of claim 16 wherein the step of acquiring said interference reference signal is performed at a location remote from a CATV system headend and the method is also performed at said headend.

21. A method of canceling interference in a CATV return path signal comprising the steps:

acquiring an interference reference signal;

processing said interference reference signal using an infinite impulse response filter when related linearly with said return path signal to produce an interference cancellation signal;

combining said interference cancellation signal with said CATV return path signal to cancel interference; and training said infinite impulse response filter with a feedback signal acquired downstream of said combined cancellation signal and return path signal.

22. A method of canceling interference in a CATV return path signal comprising the steps:

acquiring an interference reference signal;

processing said interference reference signal using a feedforward neural network when related nonlinearly with said return path signal to produce an interference cancellation signal;

combining said interference cancellation signal with said CATV return path signal to cancel interference; and training said neural network with a feedback signal acquired downstream of said combined cancellation signal and return path signal using a back propagation algorithm.

23. A method of canceling interference in a CATV return path signal comprising the steps:

acquiring an interference reference signal;

processing said interference reference signal using a radial basis function network when related nonlinearly with said return path signal to produce an interference cancellation signal;

combining said interference cancellation signal with said CATV return path signal to cancel interference; and training said radial basis function network with a feedback signal acquired downstream of said combined cancellation signal and return path signal.

24. An interference cancellation system for a CATV return path signal having a time division multiple access data stream having a plurality of time slots within which frames of data are transmitted from subscriber units comprising:

means for acquiring an interference reference signal;

means for selecting at least one time slot for use in evaluating interference;

means for sampling said selected time slot when predetermined data is transmitted therein;

means for processing said interference reference signal to produce an interference cancellation signal; and means for combining said interference cancellation signal with said CATV return path signal to cancel interference.

25. The system of claim 24 wherein said predetermined data is the absence of data such that the selected time slot is idle, and said sampling is performed on said idle time slot.

26. The system of claim 25 wherein said means for processing said interference reference signal comprises:

means for computing a discrete Fourier transform of the data resulting from said sampling of said idle time slot in each frame;

means for applying a phase correction factor to said discrete Fourier transforms of the data;

means for averaging said phase corrected discrete Fourier transforms;

means for estimating the frequencies of the interferers based on said averaged transforms; and means for generating an interference cancellation signal of said estimated frequencies.

27. The system of claim 26 wherein said means for processing said interference reference signal further includes utilizing a feedback signal acquired downstream of said combined cancellation signal and return path signal.

28. The system of claim 27 wherein said means for processing said interference reference signal further comprises:

a finite impulse response filter to process said interference reference signal when related linearly with said return path signal; and means for training said finite impulse response FIR filter with said feedback signal.

29. The system of claim 28 wherein said means for training said finite impulse response filter uses an adaptive least mean squares method algorithm.

30. The system of claim 28 wherein said means for training said finite impulse response filter uses a square root sum of the squares algorithm.

31. The system of claim 27 wherein said means for processing said interference reference signal further comprises:

an infinite impulse response filter to process said interference reference signal when related linearly with said return path signal; and means for training said infinite impulse response filter with said feedback signal.

32. The system of claim 27 wherein said means for processing said interference reference signal further comprises:

a feedforward neural network to process said interference reference signal when related nonlinearly with said return path signal; and means for training said neural network with said feedback signal using a back propagation algorithm.

33. The system of claim 25 wherein said means for processing said interference cancellation signal further comprises:

a radial basis function network to process said interference reference signal when related nonlinearly with said return path signal; and means for training said radial basis function network with said feedback signal.

34. The system of claim 25 wherein said means for sampling idle time slots is periodic.

35. The system of claim 25 wherein said means for sampling idle time slots is aperiodic.

36. The system of claim 25 wherein said means for sampling idle time slots is periodic with a higher sampling rate and reference signal generation is accomplished through reconstruction procedures suitable for non-uniform sampling schemes.

37. The system of claim 24 wherein said means for acquiring said interference reference signal is performed at a headend of a CATV system.

38. The system of claim 24 wherein said means for acquiring said interference reference signal is performed at a location remote from a CATV system headend and the method is also performed at said headend.

39. A CATV return path interference cancellation system comprising:

means for acquiring an interference reference signal by means of an antenna;

means for processing said interference reference signal to produce an interference cancellation signal;

means for combining said interference cancellation signal with said CATV return path signal to cancel interference;

means for acquiring a second interference reference signal from said combined cancellation signal and return path signal;

means for processing said second interference reference signal to produce a second interference cancellation signal; and means for combining said second interference cancellation signal with said combined cancellation signal and return path signal to cancel interference.

40. The system of claim 39 wherein the CATV return path includes a time division multiple access data stream having a plurality of time slots within which frames of data are transmitted from subscriber units and the means for acquiring a second reference signal includes:

means for selecting at least one time slot for use in evaluating interference; and means for sampling said selected time slot when predetermined date is transmitted therein.

41. The system of claim 39 wherein said means for acquiring said interference reference signal is performed at a headend of a CATV system.

42. The system of claim 39 wherein said means for acquiring said interference reference signal is performed at a headend of a CATV system.

43. The system of claim 39 wherein said means for acquiring said interference reference signal is performed at a location remote from a CATV system headend and the method is also performed at said headend.

44. A CATV return path interference cancellation system comprising:

means for acquiring an interference reference signal;

means for processing said interference reference signal using a finite impulse response filter when related linearly with said return path signal to produce an interference cancellation signal;

means for combining said interference cancellation signal with said CATV return path signal to cancel interference; and means for training said finite impulse response filter with a feedback signal acquired downstream of said combined cancellation signal and return path signal.

45. The system of claim 44 wherein the interference reference signal is acquired from the CATV return path.

46. The system of claim 44 wherein said means for acquiring said interference reference signal is by means of an antenna.

47. The system of claim 44 wherein said means for acquiring said interference reference signal is performed at a headend of a CATV system.

48. The system of claim 44 wherein said means for acquiring said interference reference signal is performed at a location remote from a CATV system headend and the method is also performed at said headend.

49. A CATV return path interference cancellation system comprising:

means for acquiring an interference reference signal;

means for processing said interference reference signal using an infinite impulse response filter when related linearly with said return path signal to produce an inteference cancellation signal;

means for combining said interference cancellation signal with said CATV return path signal to cancel interference; and means for training said infinite impulse response filter with a feedback signal acquired downstream of said combined cancellation signal and return path signal.

50. A CATV return path interference cancellation system comprising:

means for acquiring an interference reference signal;

means for processing said interference reference signal using a feedforward neural network when related nonlinearly with said return path signal to produce an interference cancellation signal;

means for combining said interference cancellation signal with said CATV return path signal to cancel interference; and means for training said neural network with a feedback signal acquired downstream of said combined cancellation signal and return path signal using a back propagation algorithm.

51. A CATV return path interference cancellation system comprising:

means for acquiring an interference reference signal;

means for processing said interference reference signal using a radial basis function network when related nonlinearly with said return path signal to produce an interference cancellation signal;

means for combining said interference cancellation signal with said CATV return path signal to cancel interference; and means for training said radial basis function network with a feedback signal acquired downstream of said combined cancellation signal and return path signal.

52. A method of canceling interference in a CATV return path signal comprising the steps:

acquiring an interference reference signal by means of an antenna;

processing said interference reference signal to produce an interference cancellation signal;

combining said interference cancellation signal with said CATV return path signal to cancel interference;

acquiring a second interference reference signal from said combined cancellation signal and return path signal;

processing said second interference reference signal to produce a second interference cancellation signal; and combining said second interference cancellation signal with said combined cancellation signal and return path signal to cancel interference.

53. The method of claim 52 wherein the CATV return path includes a time division multiple access data stream having a plurality of time slots within which frames of data are transmitted from subscriber units and the step of acquiring a second reference signal includes:

selecting at least one time slot for use in evaluating interference;

sampling said selected time slot when predetermined date is transmitted therein.

54. The method of claim 52 wherein the step of acquiring said interference reference signal is performed at a headend of a CATV system.

55. The method of claim 52 wherein the step of acquiring said interference reference signal is performed at a headend of a CATV system.

56. The method of claim 52 wherein the step of acquiring said interference reference signal is performed at a location remote from a CATV system headend and the method is also performed at said headend.

* * * * *

UNITED STATES PATENT AND TRADEMARK OFFICE
CERTIFICATE OF CORRECTION

PATENT NO. : 5,742,591
DATED : April 21, 1998
INVENTOR(S) : Himayat et al.

It is certified that error appears in the above-identified patent and that said Letters Patent is hereby corrected as shown below:

At column 4, line 2, delete "1B" and insert therefor --15--.

At column 4, line 3, delete "3B" and insert therefor --35--.

At column 4, line 10, delete "B" and insert therefor --5--.

At column 4, line 16, delete "5B" and insert therefor --55--.

At column 4, line 24, insert --110,-- between "105," and "25".

At column 5, line 8, delete the first occurrence of "utilizes a" and insert therefor --for a CATV--.

At column 5, line 37, delete "f$_s$" and insert therefor --$f_s$--.

At column 5, line 42, delete "f$_{max}$" and insert therefor --$f_{max}$--.

At column 5, line 43, delete "f$_{max}$" and insert therefor --$f_{max}$--.

At column 5, line 44, delete "f$_{max}$" and insert therefor --$f_{max}$--.

At column 5, line 49, delete "f$_{max}$" and insert therefor --$f_{max}$--.

At column 5, line 61, delete "fs" and insert therefor --$f_s$--.

UNITED STATES PATENT AND TRADEMARK OFFICE
CERTIFICATE OF CORRECTION

PATENT NO. : 5,742,591
DATED : April 21, 1998
INVENTOR(S) : Himayat et al.

It is certified that error appears in the above-identified patent and that said Letters Patent is hereby corrected as shown below:

At column 6, line 1, delete "fs/y" and insert therefor $--f_s/y--$.

At column 6, line 38, after "comprising" delete "of".

At column 8, line 44, delete "21B" and insert therefor --215--.

At column 9, line 18, delete "K" and insert therefor --K'--.

At column 9, line 27, between "unable" and "produce", insert --to--.

Signed and Sealed this

First Day of June, 1999

Attest:

Q. TODD DICKINSON

*Attesting Officer*    *Acting Commissioner of Patents and Trademarks*

Disclaimer 5,742,591 - Nageen Himayat, Huntingdon Valley; Charles A. Eldering, Doylestown, both of Pa. INTERFERENCE CANCELLATION SYSTEM FOR CATV RETURN TRANSMISSIONS. Patent dated April 21, 1998. Disclaimer filed April 30, 1999, by the assignee, General Instrument Corporation.

Hereby enters this disclaimer to claim 42, of said patent.

*(Official Gazette, June 22, 1999)*